United States Patent
Wood et al.

(10) Patent No.: US 10,423,556 B2
(45) Date of Patent: Sep. 24, 2019

(54) KVM EXTENSION DEVICE SELF-CONTAINED WITHIN A VIDEO CONNECTOR

(71) Applicant: AVOCENT HUNTSVILLE, LLC, Huntsville, AL (US)

(72) Inventors: Christopher Wood, Madison, AL (US); Phillip R. Kent, Monroe, WA (US)

(73) Assignee: Vertiv IT Systems, Inc., Huntsville, AL (US)

( * ) Notice: Subject to any disclaimer, the term of this patent is extended or adjusted under 35 U.S.C. 154(b) by 0 days.

(21) Appl. No.: 15/808,455

(22) Filed: Nov. 9, 2017

(65) Prior Publication Data
US 2019/0138475 A1    May 9, 2019

(51) Int. Cl.
| | |
|---|---|
| *G06F 13/38* | (2006.01) |
| *G06F 13/42* | (2006.01) |
| *H01R 31/06* | (2006.01) |
| *H01R 27/02* | (2006.01) |
| *H01R 13/506* | (2006.01) |
| *H01R 13/641* | (2006.01) |
| *H01R 13/639* | (2006.01) |

(52) U.S. Cl.
CPC ........ *G06F 13/385* (2013.01); *G06F 13/4286* (2013.01); *H01R 13/506* (2013.01); *H01R 13/639* (2013.01); *H01R 13/641* (2013.01); *H01R 27/02* (2013.01); *H01R 31/065* (2013.01); *G06F 2213/0002* (2013.01); *G06F 2213/0042* (2013.01)

(58) Field of Classification Search
CPC ............... G06F 13/385; G06F 13/4286; G06F 2213/0002; G06F 2213/0042
USPC .......................................................... 710/313
See application file for complete search history.

(56) References Cited

U.S. PATENT DOCUMENTS

| | | | |
|---|---|---|---|
| 8,308,507 B2 | 11/2012 | Lin | |
| 8,514,929 B2 | 8/2013 | Erickson et al. | |

(Continued)

FOREIGN PATENT DOCUMENTS

| | | |
|---|---|---|
| CN | 206727367 U | 12/2017 |
| KR | 20140023059 A | 2/2014 |

OTHER PUBLICATIONS

Google Search Image for adapters, pp. 1-4.*

(Continued)

*Primary Examiner* — Christopher B Shin
(74) *Attorney, Agent, or Firm* — Harness, Dickey & Pierce, P.L.C.

(57) ABSTRACT

The present disclosure is directed to an apparatus for forming an interface for interfacing a remote access appliance ("RAC") to a target device ("TD") and enabling video and serial communications between the RAC and TD. The apparatus makes use of a housing having a first port, a second port and a third port. A circuit board may be housed within the housing for enabling serial and video communications between the TD and the RAC. The first port enables an interface to the apparatus via a communications cable in communication with the RAC. The second port enables a serial connection between the apparatus and the TD via an independent serial communications cable. The third port forms a video connector connectable directly to a video port of the target device for enabling video communications between the TD and the apparatus.

20 Claims, 4 Drawing Sheets

(56) References Cited

U.S. PATENT DOCUMENTS

| | | |
|---|---|---|
| 9,129,069 B2 * | 9/2015 | Lo .................... G06F 13/4068 |
| 2003/0176109 A1 * | 9/2003 | Fukuchi ............ H01R 31/005 |
| | | 439/638 |
| 2003/0216069 A1 * | 11/2003 | Huang ................... G06F 1/266 |
| | | 439/105 |
| 2005/0164545 A1 * | 7/2005 | Rosenthal ............. H01R 13/72 |
| | | 439/501 |
| 2006/0030220 A1 | 2/2006 | Belopolsky et al. |
| 2006/0125445 A1 * | 6/2006 | Cao ....................... H02J 7/0031 |
| | | 320/112 |
| 2008/0040527 A1 * | 2/2008 | Filipov ................ G06F 1/1632 |
| | | 710/303 |
| 2008/0059681 A1 * | 3/2008 | Lodolo ................ G06F 1/1632 |
| | | 710/303 |
| 2008/0254684 A1 * | 10/2008 | Tracy .................. G06F 1/1616 |
| | | 439/620.21 |
| 2013/0054848 A1 | 2/2013 | Huang |
| 2013/0227315 A1 * | 8/2013 | Hammond ............. G06F 1/266 |
| | | 713/300 |
| 2013/0232352 A1 * | 9/2013 | Kent ..................... G06F 1/263 |
| | | 713/310 |
| 2013/0297844 A1 | 11/2013 | Rosenberg et al. |
| 2013/0318261 A1 * | 11/2013 | Cheng ................. G06F 13/385 |
| | | 710/62 |
| 2014/0051280 A1 | 2/2014 | Oh |
| 2016/0006202 A1 | 1/2016 | Dupuis et al. |
| 2016/0012001 A1 * | 1/2016 | Chang ................. G06F 13/4022 |
| | | 710/316 |
| 2016/0134928 A1 * | 5/2016 | Ogle ....................... H02G 3/121 |
| | | 725/85 |
| 2016/0202743 A1 * | 7/2016 | Li ............................. G06F 1/26 |
| | | 710/313 |
| 2016/0227149 A1 * | 8/2016 | Dickens ................. G11B 27/00 |
| 2018/0131148 A1 * | 5/2018 | Liu ........................ G05B 15/02 |
| 2018/0143916 A1 * | 5/2018 | Gupta .................. G06F 13/102 |
| 2018/0145469 A1 * | 5/2018 | Chung ............... H01R 13/7039 |
| 2018/0375672 A1 * | 12/2018 | Thiers ..................... H04L 12/10 |

OTHER PUBLICATIONS

Google Search Image for adapters, pp. 1-5.*
Google Search Image for adapters, pp. 1-8.*
International Search Report and Written Opinion for International Application No. PCT/US2018/057008, dated Mar. 7, 2019, 9 pp.

* cited by examiner

KVM EXTENSION DEVICE SELF-CONTAINED WITHIN A VIDEO CONNECTOR

FIELD

The present disclosure relates to devices for interfacing remote access appliances to target devices, and more particularly to a device which forms an integrated video connector and KVM extension device which is able to interface a remote access appliance to a target device.

BACKGROUND

This section provides background information related to the present disclosure which is not necessarily prior art.

Remote access appliances, also known as "Keyboard/Video/Mouse" ("KVM") appliances, are often used to enable remote access from a user's personal electronic device, typically a laptop or a desktop computer, to a target device within a data center. Often the target device is a server, but this is only one example, and the target device could be any data center device that the user needs to communicate with.

Typically the KVM appliance is coupled to the target device, which as noted above is often a data center device, and more typically a server. The coupling is achieved by an interface device known in the industry as a "rack interface pod" ("RIP") or a "digital rack interface pod" ("DRIP"). In either case, the interface device typically connects to an RJ45 port of the remote access appliance via a first cable, which may be a CAT5 or similar cable. A second cable, which is typically a video cable which is hard-wired to the interface device, extends out from the interface device and is coupled to a video port of the target device (e.g., a server). A third cable, typically a USB cable, may be hardwired or coupled via a releasable USB connector to the interface device. The third cable forms a serial communications link between the interface device and the target device. Thus, the second and third cables form the means by which serial communications and video information may be transferred between the interface device and the target device.

While the above described interface device has performed well in a data center environment, the requirement of three cables extending from the interface device (i.e., CAT5, USB and video) can make for a complex arrangement of cabling at the equipment rack where the interface device is being used. If an entire equipment rack is filled with servers each having an interface device coupled thereto, one can easily see that this creates a voluminous arrangement of cables that must be managed. If all of the equipment racks in a row are filled with servers or other devices to which such interface devices are coupled, the amount of cabling grows almost exponentially. Accordingly, a need still exists for an interface device that is able to interface data center devices with a KVM appliance with a significantly reduced amount of cabling.

SUMMARY

This section provides a general summary of the disclosure, and is not a comprehensive disclosure of its full scope or all of its features.

In one aspect the present disclosure relates to an apparatus which forms an interface for interfacing a remote access appliance to a target device and enabling video and serial communications between the remote access appliance and the target device. The apparatus may comprise a housing having a first port, a second port and a third port. A circuit board may be included which is housed within the housing for enabling serial and video communications between the target device and the remote access appliance. The first port enables an interface to the apparatus via an independent communications cable in communication with the remote access appliance. The second port enables a serial connection to be established between the apparatus and the target device via an independent serial cable in communication with a serial port of the target device and with the second port. The third port includes a video connector connectable directly to a video port of the target device for enabling video communications between the target device and the apparatus.

In another aspect the present disclosure relates to an apparatus forming an interface for interfacing a remote access appliance to a target device and enabling video and serial communications between the remote access appliance and the target device. The apparatus may comprise a housing having a first port, a second port, a third port, a front side and a rear side. A circuit board may be included which is housed within the housing for enabling serial and video communications between the target device and the remote access appliance. The first port may include an RJ45 port for enabling an independent communications cable to be used to interface the apparatus to the remote access appliance. The second port may include a USB port to enable a serial connection to be established between the apparatus and the target device via an independent USB cable. The first and second ports may be disposed on a front side of the housing, and the third port may include a video connector adapted to be directly secured to a mating video connector on the target device, for enabling a communication of video information between the target device and the apparatus. The third port is disposed on the rear side of the housing.

In still another aspect the present disclosure relates to a method for interfacing a remote access appliance to a target device and enabling video and serial communications between the remote access appliance and the target device. The method may comprise forming a housing having a first port, a second port and a third port. The method may further include disposing a circuit board within the housing which enables serial and video communications between the target device and the remote access appliance. The method may also include using the first port to interface to an independent communications cable in communication with the remote access appliance, to thus form an interface between the circuit board and the remote access appliance. The method may further include using the second port to help form a serial connection, via an independent serial cable, with the target device, to thus form a serial interface between the circuit board and the target device. The method may also include using the third port to form a direct interface to a video port of the target device, to thus interface the circuit board to the video port of the target device.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. Corresponding reference numerals indicate corresponding parts throughout the several views of the drawings, wherein.

DETAILED DESCRIPTION

Example embodiments will now be described more fully with reference to the accompanying drawings.

Referring to FIGS. 1-4 an apparatus 10 is shown for forming an interface between a remote access appliance, for example a Keyboard/Video/Mouse ("KVM") appliance, and a target device. Merely for convenience, the following description will reference the remote access appliance as being a KVM appliance, with it being understood that the apparatus 10 may be used to interface the target device to other subsystems (e.g., network switch). The target device may be any device having a serial interface and a video interface, for example a server. The apparatus 10 forms an integrated device which enables the needed serial and video connections between the KVM appliance and the target device to be made in a more organized manner and while reducing the number of independent cables typically used with traditional rack interface pods ("RIPs"). An additional advantage is the significantly reduced form factor of the apparatus 10, as compared to traditional RIPs, which enables the apparatus 10 to be easily coupled to a target device without obscuring unused ports of the target device.

FIGS. 1-4 illustrate that the apparatus 10 includes a housing 12 having upper 12a and lower 12b housing portions which may be secured together with a snap fit, by adhesives or by threaded fasteners, or by any other suitable connecting structure. A front side 14 of the housing 12 includes a first port 16 and a second port 18 positioned in a generally side-by-side configuration. The first port 16 in this example is an RJ45 port (hereinafter simply "RJ45 port 16") that enables an RJ45 connector associated with a CAT5 or similar cable to be coupled to the apparatus 10. The other end of the CAT5 or similar cable would be coupled to a port of the KVM appliance. The second port 18 in this example is a USB port, and more particularly a USB micro B port (hereinafter simply "USB port 18"). The USB port 18 enables a USB serial connection to be made between the apparatus 10 and the target device. While a USB micro B port is shown in this example, any other type of USB port may be used in place of a USB micro B style port, for example a USB micro A port, a USB Mini A or B port, or a USB type A or type B port. If a USB type A or B port is used, it will be appreciated that the form factor (i.e., overall dimensions) of the housing 12 may need to be increased slightly to accommodate the physically larger dimensions of such a style of USB connector.

Figure 1:
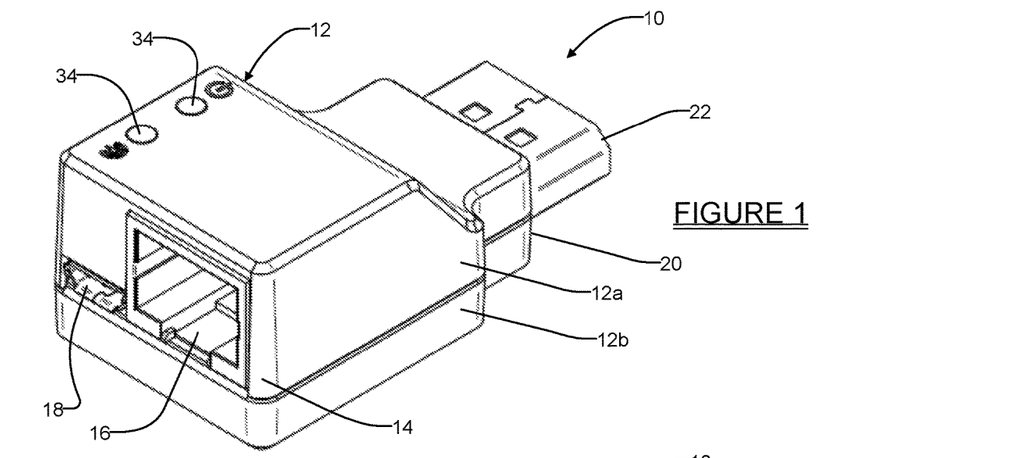
FIG. 1 is a front perspective view of an apparatus which forms an integrated KVM extension device and video connector in accordance with one embodiment of the present disclosure.
Figure 2:
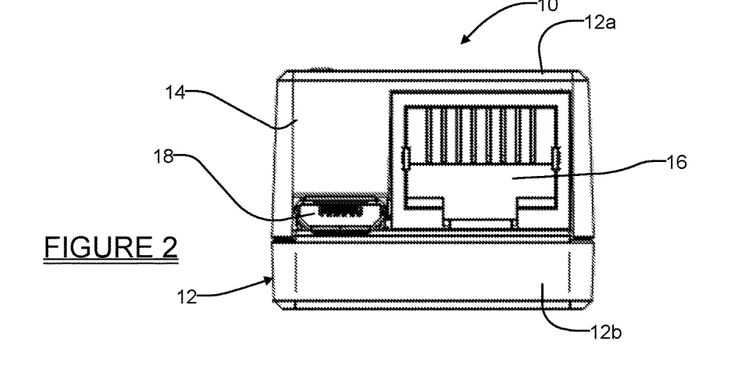
FIG. 2 is a front view of the apparatus of FIG. 1.
Figure 3:
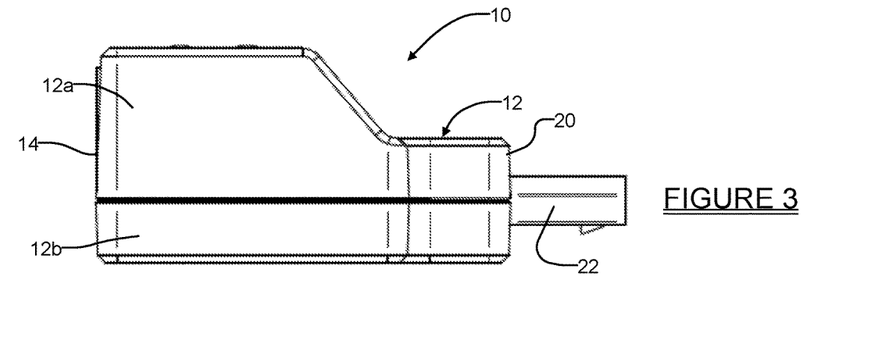
FIG. 3 is a left side view of the apparatus of FIG. 1.

Referring to FIGS. 1 and 3, a second or rear side 20 of the housing 12, which is opposite the front side 14, includes a third port 22. The third port 22 in this example is a male video connector in the form of a DisplayPort connector (hereinafter referred to as "DP connector 22"). The DP connector 22 enables the apparatus 10 to be directly coupled to the video port of a target device. This eliminates the need to use a separate video cable to make the needed connection between the apparatus 10 and the video port of the target device This enables video to be transmitted from the target device directly to the DP connector 22 of the apparatus 10, and then from the apparatus 10 to the KVM appliance.

Figure 4:
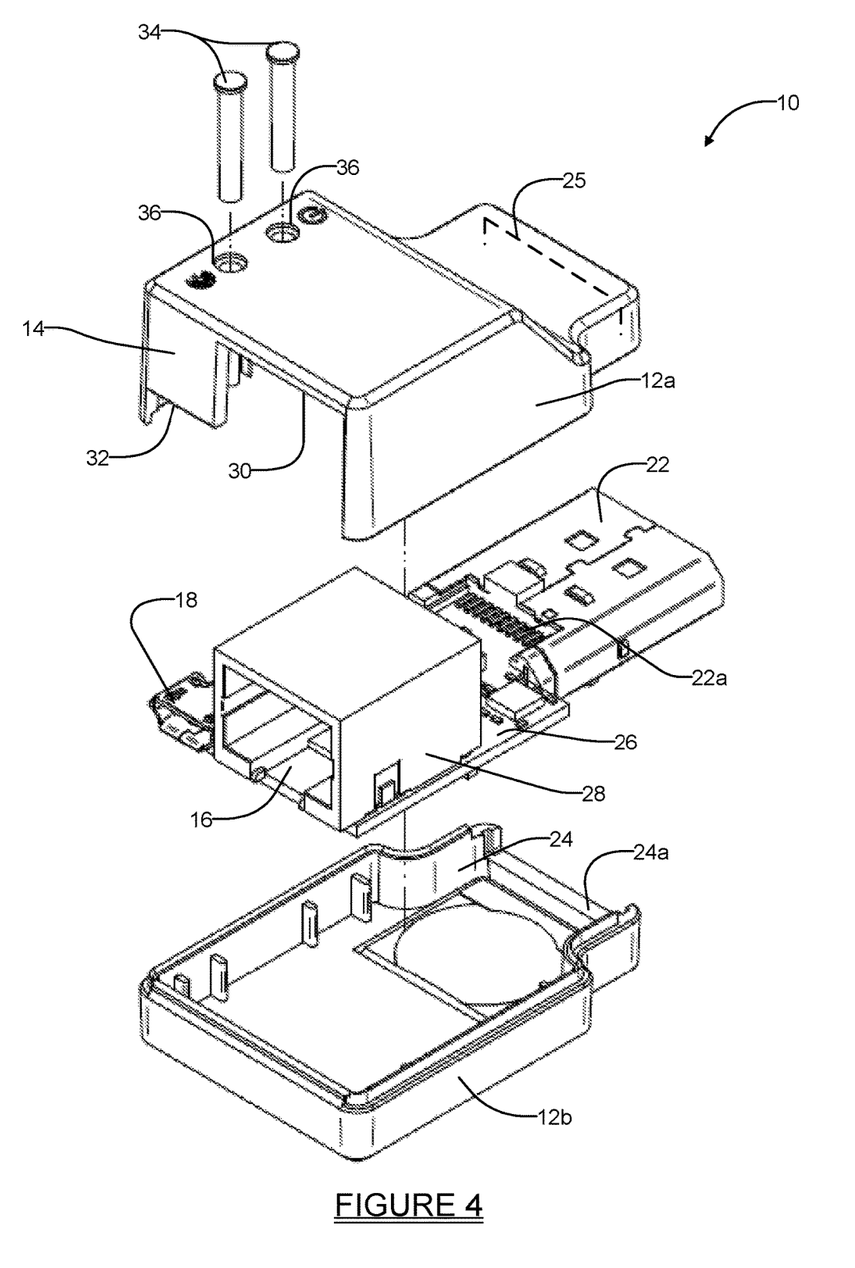
FIG. 4 is an exploded perspective view of the apparatus of FIG. 1 showing the circuit board housed with a housing of the apparatus.

FIG. 4 illustrates a portion of the internal construction of the apparatus 10. The second housing portion 12b includes a recess 24 shaped to accommodate a portion of the DP connector 22. The second housing portion 12b includes a cutout portion 24a, and the first housing portion 12a includes a cutout portion 25, which cooperate to form an opening in the housing 12 through which a portion of the DP connector 22 projects when the apparatus 10 is fully assembled. A circuit board 26 is housed in the first portion 12a of the housing and is shaped generally in accordance with perimeter profile of the housing 12. The RJ45 port 16 may be secured within an opening 30 in the first housing portion 12a. The USB port 18 may be secured within an opening 32 next to the opening 30.

The circuit board 26 includes the needed electronic components to form an electronic subsystem which is able to perform the serial and video communications interfacing between the target device and the KVM appliance. As such components are well known in the art, no specific description here is needed for those components. A plurality of pins 22a of the DP connector 22 may be electrically coupled directly to the circuit board 26. The housing portions 12a and 12b may be coupled together with a snap fit, with adhesives, or by any other suitable means, once the circuit board 26, the DP connector 22, RJ45 port 16 and USB port 18 are fully assembled within the housing 12.

With further reference to FIGS. 1 and 4, a pair of light pipes 34 may be included to provide power and status information. The light pipes 34 may each have one end positioned adjacent a corresponding LED (not shown) on the circuit board 26 and may be visible through corresponding holes 36 in the housing portion 12a.

An important advantage of the apparatus 10 is that only a single cable (i.e., a CAT5 or equivalent cable) extends to the apparatus 10, and only a single cable (i.e., a USB cable) extends from the housing 12 of the apparatus when the apparatus is secured to the video port of a target device. This significantly de-clutters the area around where cables need to be attached to the target device (i.e., typically either a rear panel or a front panel of the target device). The reduction in cabling also provides a significant cost reduction when implementing the apparatus 10 as the interfacing device between a KVM appliance and a target device. Still further, eliminating the need to use a standard video cable eliminates the chance that the video cable may come loose or detached, which could give rise to a need for troubleshooting by data center personnel to determine why a video connection with a given target device has been lost.

Another advantage of the apparatus 10 is that it has a form factor substantially similar to a traditional video connector. This is achieved in part by eliminating the need for the two thumb screws that are typically present on a traditional video connector.

Figure 5:
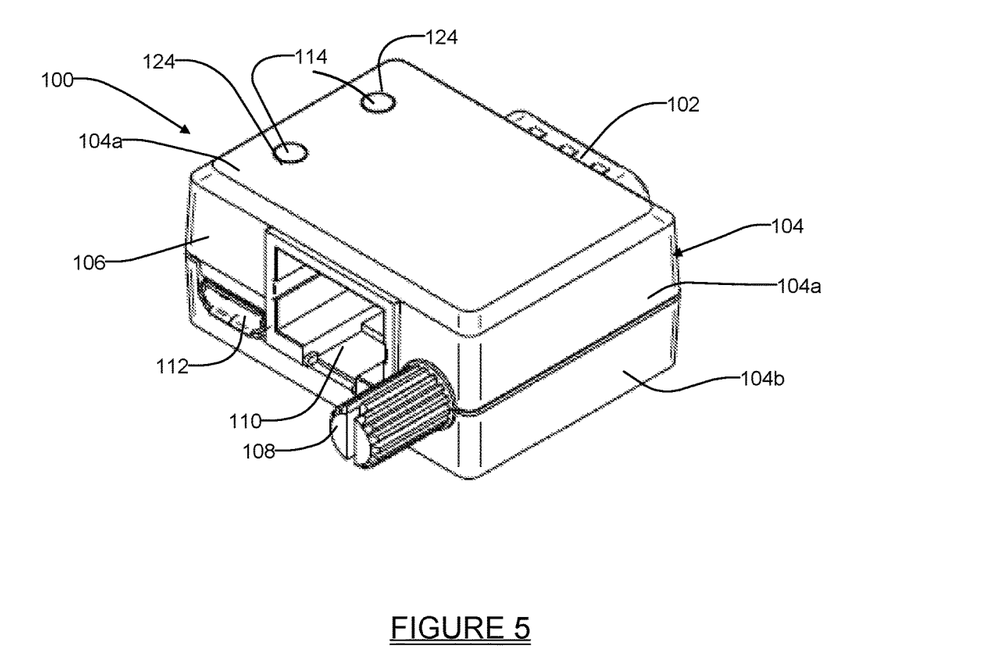
FIG. 5 is a front perspective view of an apparatus in accordance with another embodiment of the present disclosure.
Figure 6:
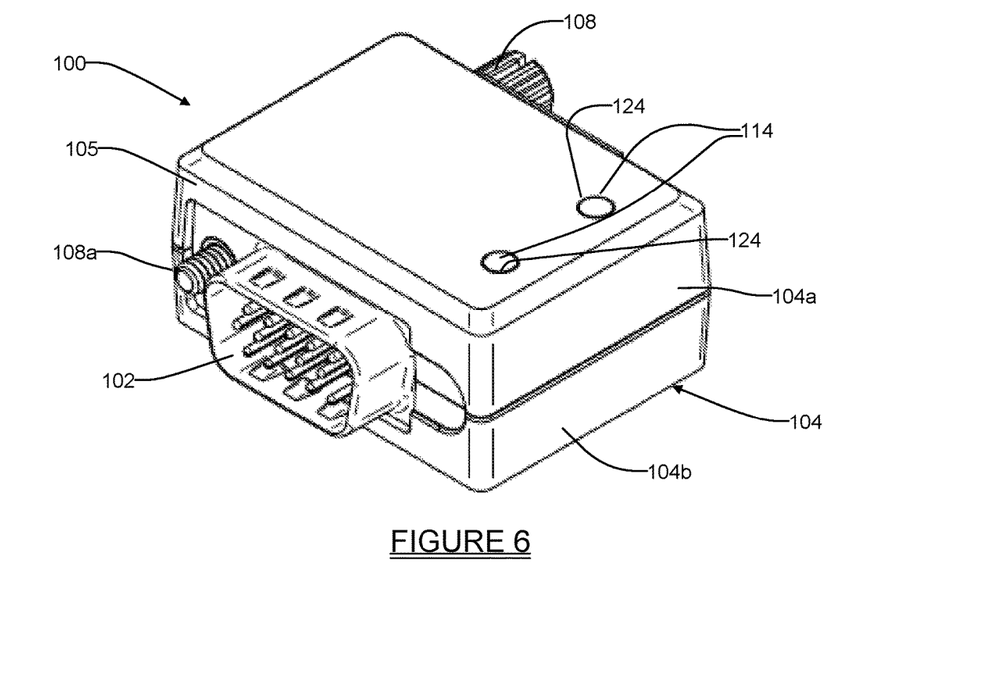
FIG. 6 is a rear perspective view of the apparatus of FIG. 5.
Figure 7:
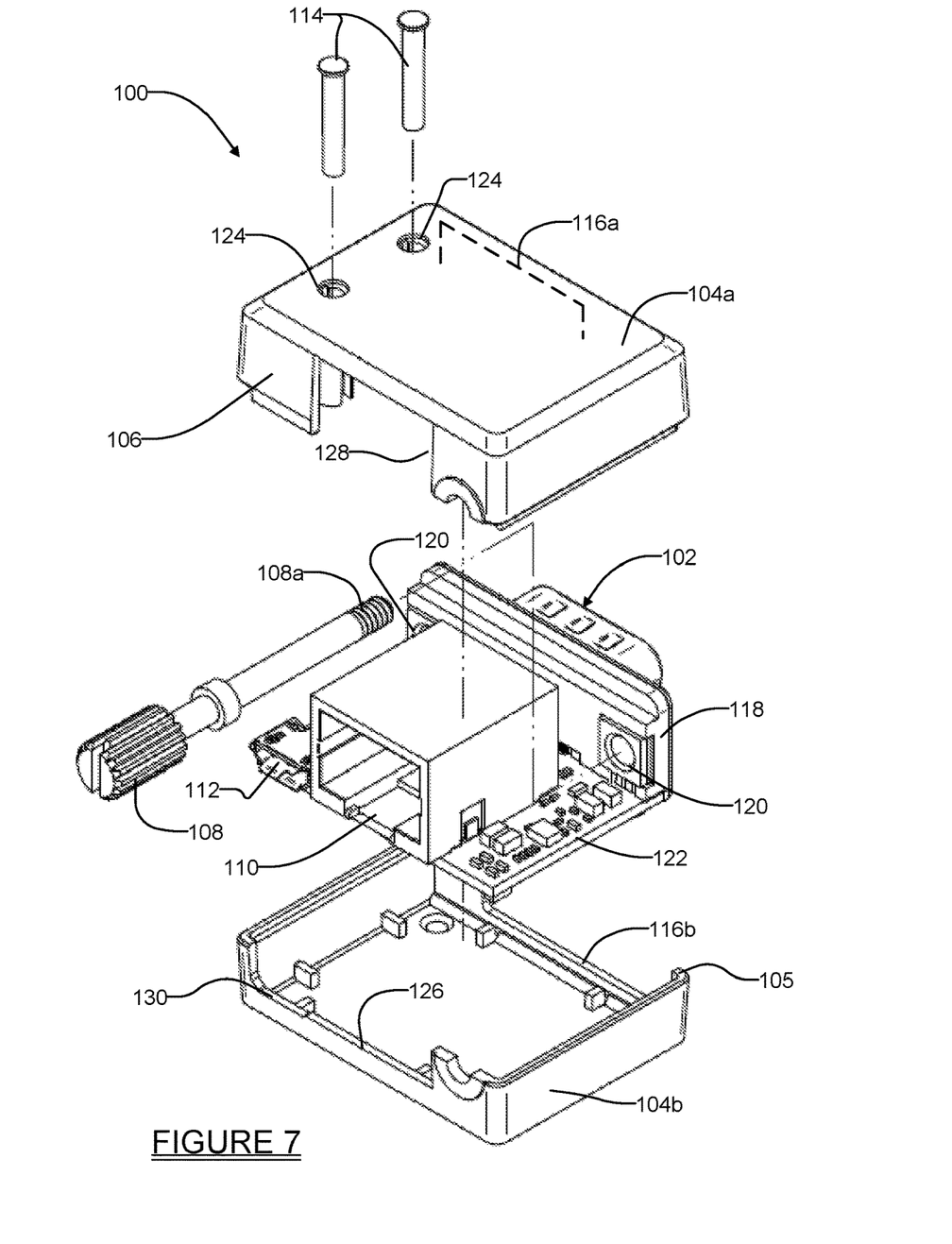
FIG. 7 is an exploded perspective view of the various components of the apparatus of FIG. 5.

Referring to FIGS. 5-7, an apparatus 100 is shown in accordance with another embodiment of the present disclosure. The apparatus 100 is similar in construction to the apparatus 10 but instead of the DP connector 22, the apparatus 100 includes a third port 102 formed by a HD-15 video connector (hereinafter "HD-15 connector 102"). The apparatus 100 includes a two-piece housing 104 made up of housing portions 104a and 104b. A front side 106 of the apparatus 100 includes a thumbscrew 108, a first port 110 and a second port 112, wherein the first and second ports are positioned in a generally side-by-side configuration. The first port 110 may be an RJ45 port (hereinafter "RJ45 port 110"). The second port 112 may be a serial port, for example a USB port (hereinafter "USB port 112"). Again, the USB port 112 may take the form of a USB micro A or B port, a USB mini A or B port, or a USB type A or B port. The two housing portions 104a and 104b may be secured together via adhesives and/or with a snap fit construction. Alternatively, the housing portions 104a and 104b may be secured together using threaded fasteners provided that suitable holes and threaded portions are included in housing portions 104a and 104b to accommodate the fasteners. FIG. 7 also illustrates that the thumbscrew 108 includes a threaded portion 108a which may be used to engage with a corresponding threaded hole of a video port on the target device.

FIG. 7 illustrates various internal components of the apparatus 100. The HD-15 video connector 102 is positioned to extend partially outwardly of a rear side 105 of the housing 104 through an opening formed by cutouts 116a and 116b in the housing portions 104a and 104b, respectively. The HD-15 connector 102 includes a frame portion 118 having openings 120, one of which receives the threaded portion 108a of the thumbscrew 108. A circuit board 122 is shaped generally in accordance with a footprint of the housing portion 104b and may be positioned within the housing portion 104b during assembly of the apparatus 100. The circuit board 122 contains the needed electronic components to form an electronic subsystem for implementing serial and video communications. Light pipes 114 extend into corresponding holes 124 in the housing portion 104a for providing visual signals from LEDs (not shown) mounted on the circuit board 122.

FIG. 7 shows the RJ45 connector 110 positioned in cutouts 126 and 128 in the housing sections 104b and 104a, respectively, and electrically and mechanically coupled to the circuit board 122. The USB connector 112 is positioned within a cutout 130 in the housing portion 104b to reside adjacent to the RJ45 connector 110, and is electrically and mechanically coupled to the circuit board 122.

While the apparatus 100 makes use of only a single threaded thumbscrew 108, it will be appreciated that two thumbscrews may be used just as well. However, this will likely necessitate increasing the form factor of the apparatus 100 slightly. The apparatus 100 can be securely connected to a mating HD-15 video port with only a single thumbscrew in view of the extremely light weight and compact construction of the apparatus. The same advantages are provided by the apparatus 100 as mentioned previously for the apparatus 10, namely, a significant reduction in cabling and de-cluttering the area around the target device, as well as eliminating the possibility of an external video cable becoming disconnected from either the target device or from the apparatus 100.

It will also be appreciated that while the DP connector 22 and the HD-15 connector 102 have been shown as male devices, female connectors could be used instead. The selection of a male or a female style video connector will depend on the port style available on the target device. In most instances it is anticipated that female video ports will be provided on the target device.

It will also be appreciated that while the DP connector 22 and the HD-15 connector 102 have been shown as being positioned on sides of the housing (12 or 104) which oppose the RJ45 port (16 or 110) and the USB port (18 or 112), that the USB ports (18 or 112) could just as easily be positioned on a lateral side of the housing to extend perpendicularly from the video connector (22 or 102). It is anticipated, however, that the most convenient arrangement will be arranging the video connector (DP connector 22 or HD-15 connector 102) on a surface of the housing (12 or 104) which opposes the RJ45 and USB ports.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An apparatus forming an interface for interfacing a remote access appliance to a target device and enabling video and serial communications between the remote access appliance and the target device, the apparatus comprising:
    a housing having a front side and a rear side;
    the housing further including a first port, a second port and a third port;
    a circuit board housed within the housing for enabling serial and video communications between the target device and the remote access appliance;
    the first port mounted on the circuit board and in communication with the circuit board which enables an interface to the apparatus via an independent communications cable in communication with the remote access appliance;
    the second port in communication with the circuit board which enables a serial connection to be established between the apparatus and the target device via an independent serial cable in communication with a serial port of the target device and with the second port; and
    the third port including a video connector directly physically connected to, and in electrical communication with, the circuit board and mounted directly to the rear side of the housing so as to be at least partially housed and encapsulated within the rear side of the housing, the video connector, the housing, the first port and the second port cooperatively forming a unitary, rigid structure, and the video connector being connectable directly to a video port of the target device without intervening cabling and such that the housing is directly, fully supported from the video port of the target device, the video connector enabling video communications between the target device and the apparatus.

2. The apparatus of claim 1, wherein the first port comprises an RJ45 port.

3. The apparatus of claim 1, wherein the second port comprises a USB port.

4. The apparatus of claim 3, wherein the USB port comprises at least one of a USB micro port and a USB mini port.

5. The apparatus of claim 3, wherein the USB port comprises at least one of a USB Type A port and a USB Type B port.

6. The apparatus of claim 1, wherein the third port comprises a DisplayPort connector.

7. The apparatus of claim 1, wherein the third port comprises an HD-15 video connector.

8. The apparatus of claim 7, wherein the HD-15 video connector comprises a male HD-15 video connector.

9. The apparatus of claim 1, wherein the first and second ports are positioned on the front side of the housing.

10. The apparatus of claim 1, wherein:
    the housing comprises a two piece housing having an upper portion and a lower portion; and
    the first and second ports are positioned on the front side.

11. The apparatus of claim 1, wherein the housing includes a thumbscrew for assisting in securing the housing to a port of the target device.

12. An apparatus forming an interface for interfacing a remote access appliance to a target device and enabling video and serial communications between the remote access appliance and the target device, the apparatus comprising:
    a two piece housing having a first port, a second port, a third port, a front side and a rear side;
    a circuit board housed within the housing for enabling serial and video communications between the target device and the remote access appliance;
    the first port including an RJ45 port mounted in the housing for enabling an independent communications cable to be used to interface the apparatus to the remote access appliance;
    the second port mounted in the housing and including a USB port to enable a serial connection to be established between the apparatus and the target device via an independent USB cable;
    the first and second ports being disposed on the front side of the housing;
    the third port including a video connector coupled directly to the circuit board and partially housed and enclosed within the rear side of the two piece housing, and forming a rigid, unitary structure with the housing and an integral portion of the housing, the third port adapted to be directly secured to a mating video connector on the target device without intervening cabling such that the housing is fully directly supported from the mating video connector on the target device when the apparatus is connected to the mating video connector, the third port enabling a communication of video information between the mating video connector on the target device and the apparatus.

13. The apparatus of claim 12, wherein the video connector comprises a DisplayPort connector.

14. The apparatus of claim 12, wherein the video connector comprises a HD-15 connector.

15. The apparatus of claim 14, wherein the HD-15 connector comprises a male HD-15 video connector.

16. The apparatus of claim 12, wherein the housing comprises a thumbscrew for assisting in securing the housing to the mating video connector on the target device.

17. The apparatus of claim 12, wherein the first and second ports are positioned side by side on the front side of the housing.

18. A method for interfacing a remote access appliance to a target device and enabling video and serial communications between the remote access appliance and the target device, the method comprising:

forming a housing having a first port, a second port and a third port;

disposing a circuit board within the housing which enables serial and video communications between the target device and the remote access appliance;

arranging the third port to be partially housed within the housing and directly electrically connected to the circuit board, to thus form a rigid, unitary structure with the housing and an integral portion of the housing;

using the first port to interface to an independent communications cable in communication with the remote access appliance, to thus form an interface between the circuit board and the remote access appliance;

using the second port to help form a serial connection, via an independent serial cable, with the target device, to thus form a serial interface between the circuit board and the target device; and using the third port to directly couple the housing to a mating video port of the target device, to form a direct interface to the mating video port of the target device, to thus interface the circuit board to the mating video port of the target device, and further such that the housing is fully directly supported from the mating video port of the target device without the need for an intervening cable, when the housing is coupled to the mating video port of the target device.

19. The method of claim 18, wherein using the third port to form a direct interface comprises using at least one of a DisplayPort video connector and an HD-15 video port connector to interface directly to the video port of the target device.

20. An apparatus forming an interface for interfacing a remote access appliance to a target device and communications between the remote access appliance and the target device, the apparatus comprising:

a housing having a front side and a rear side;

the housing further including a first port, a second port and a third port;

a circuit board housed within the front side of the housing for enabling the apparatus to provide serial and video communications capability to the remote access appliance;

the first port being in communication with the circuit board and enabling an interface to the apparatus via an independent communications cable in communication with the remote access appliance;

the second port being in communication with the circuit board and enabling a serial connection to be established between the apparatus and the target device via an independent serial cable in communication with a serial port of the target device and with the second port; and the third port including a video connector coupled directly to the circuit board and mounted directly to the rear side of the housing, so as to be at least partially housed and encapsulated within the rear side of the housing, to form an integral, rigid and unitary structure with the housing, the video connector being in communication with the circuit board and enabling the apparatus to receive video communications from an external video source and to be fully directly supportable, without an intervening cable, from a video port of the external video source.

* * * * *